UNITED STATES PATENT OFFICE.

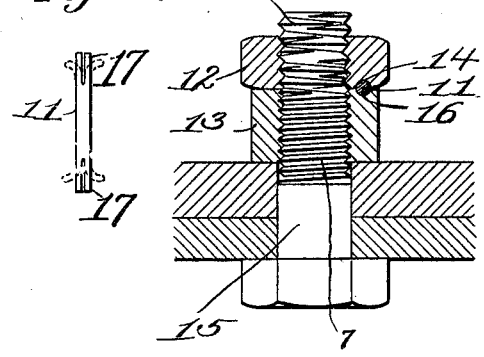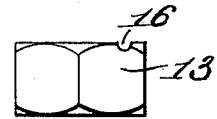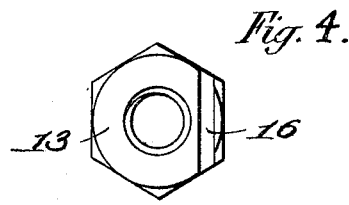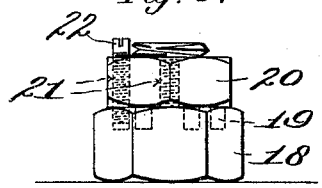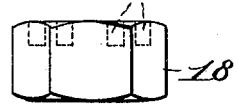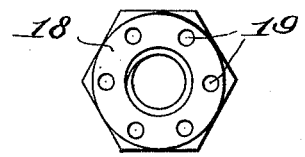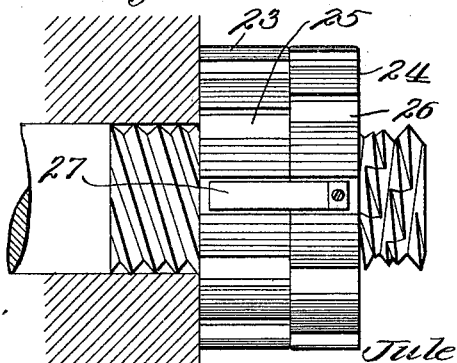

JULES LEVY MAURICE, OF PARIS, FRANCE.

NUT-LOCK.

1,005,727. Specification of Letters Patent. Patented Oct. 10, 1911.

Application filed August 2, 1909. Serial No. 510,758.

*To all whom it may concern:*

Be it known that I, JULES LEVY MAURICE, a citizen of the French Republic, residing at 13bis Rue des Mathurins, Paris, France, have invented Improvements in Nut-Locks, of which the following is a specification.

The present invention has reference to improvements in nut locks, and it comprehends, generally, the formation upon a bolt or the like of an auxiliary secondary tread which differs in pitch from the principal or primary thread, and the provision of a pair of nuts formed each with a thread corresponding to one of the threads on said bolt, means being further provided for preventing relative rotation of the two nuts upon the bolt.

More especially, and primarily, the invention resides in the particular construction of the bolt threads, these threads being characterized by the fact that the pitch of each one closely approximates that of the other but is not a multiple thereof, so that the adherence between the two nuts is substantially the same as if the two pitches were equal, and the points of intersection of the two threads will be distributed uniformly around the bolt, whereby ovalizing of the latter is completely avoided.

The invention is illustrated in the accompanying drawings, wherein—

Figure 1 is a front elevation of the improved bolt, the nuts mounted on said bolt being shown in section; Fig. 2 is a plan view of the locking wedge employed for preventing relative rotation of the nuts. Figs. 3 and 4 are, respectively, a side elevation and a plan view of the primary nut. Fig. 5 is a side elevation of a modification of the construction shown in Fig. 1, the primary nut utilized in this construction being shown in side elevation and plan, respectively, in Figs. 6 and 7; and Fig. 8 is a view of a further modification.

Reference being had to said drawings, the bolt 15 is shown as provided with right-hand and left-hand triangular threads 7 and 8, which constitute, respectively, the primary and secondary threads and are preferably cut to different depths, the primary and secondary nuts 13 and 12 being similarly threaded. The pitch of each thread closely approximates that of the other thread, but is not a multiple thereof.

For preventing the rotation or displacement of the nuts on the bolt, various devices may be provided. In Fig. 1, for instance, a wedge or key 11, shown in detail in Fig. 2 is employed. This wedge or key is driven into mating grooves 14 and 16 formed in the mutually-adjacent faces of the secondary and primary nuts 12 and 13, respectively. In this connection, it may be stated that the groove 16 is formed in nut 13, preferably by means of a drill, after both nuts have been screwed fast on the bolt 15, the groove in nut 12 being formed prior to the disposition of that nut upon said bolt. The wedge or key is made fast in its grooves 14 and 16 by bending its split ends 17 outward.

A further method of carrying out the invention is illustrated in Fig. 5, where the primary nut 18 is shown as provided with a circular series or row of shallow holes 19, (see Figs. 6 and 7), and the secondary nut 20 as provided with one or more threaded holes 21, for the reception of a screw pin 22. Said pin is inserted after both nuts have been screwed home, its lower end being received in one of the holes 19.

The invention may also be carried out by means of the structure shown in Fig. 8, in which form the round primary and secondary nuts 23 and 24 employed are furnished with peripheral grooves 25 and 26 for the reception of one or more locking pieces or tongues 27 secured to the secondary nut, the number of grooves provided on one nut being different from that on the other nut. The thread of the primary nut is preferably of greater pitch than that of the secondary nut.

With regard to the threads, it is of essential importance that the pitches thereof should closely approximate each other and that neither pitch be a multiple of the other, as has already been stated. In this respect, the improved bolt of the present invention differs materially from the ordinary form of bolt provided with oppositely-disposed intersecting threads, for in such form the threads either have the same pitch, or the pitch of one thread is a multiple of that of the other thread. In both of the instances specified, the points of intersection of the two threads are disposed in alinement with each other, producing, substantially, two parallel lines of depressions located diametrically opposite each other, so that the bolt has necessarily an approximately oval appearance when viewed from its threaded end, rather than a true circular appearance. On the other hand, where the two pitches closely approximate each other and neither is a multiple of the other, as is the case with the present improved bolt, the adherence between the two nuts is substantially the same as if the two pitches were equal, and the cutting of the secondary thread on the bolt is facilitated and does not appreciably weaken the primary thread; also, the points of intersection of the two threads are distributed uniformly around the threaded portion of said bolt, thus preserving its requisite circular appearance, when viewed in the manner above stated.

I claim as my invention:

1. In a nut lock, the combination of a bolt having a pair of intersecting threads of different pitches formed thereon, said threads being characterized by the fact that the pitch of each one closely approximates that of the other but is not a multiple thereof, whereby their points of intersection are disposed uniformly around the bolt and out of alinement with each other; and a pair of nuts mounted on the threaded portion of the bolt and provided each with a thread corresponding to one of the threads on said bolt.

2. In a nut lock, the combination of a bolt having a pair of intersecting threads of different pitches formed thereon, said threads being characterized by the fact that the pitch of each one closely approximates that of the other but is not a multiple thereof, whereby their points of intersection are disposed uniformly around the bolt and out of alinement with each other; a pair of nuts mounted on the threaded portion of the bolt, said nuts being formed with seats adapted to register with each other, and being provided each with a thread corresponding to one of the threads on said bolt; and a member fitted in said seats for preventing independent movement of said nuts.

In testimony whereof, I affix my signature, in presence of two witnesses.

JULES LEVY MAURICE.

Witnesses:
H. C. COXE,
Q. MANDELARTZ.

---

Copies of this patent may be obtained for five cents each, by addressing the "Commissioner of Patents, Washington, D. C."